Figure 1:
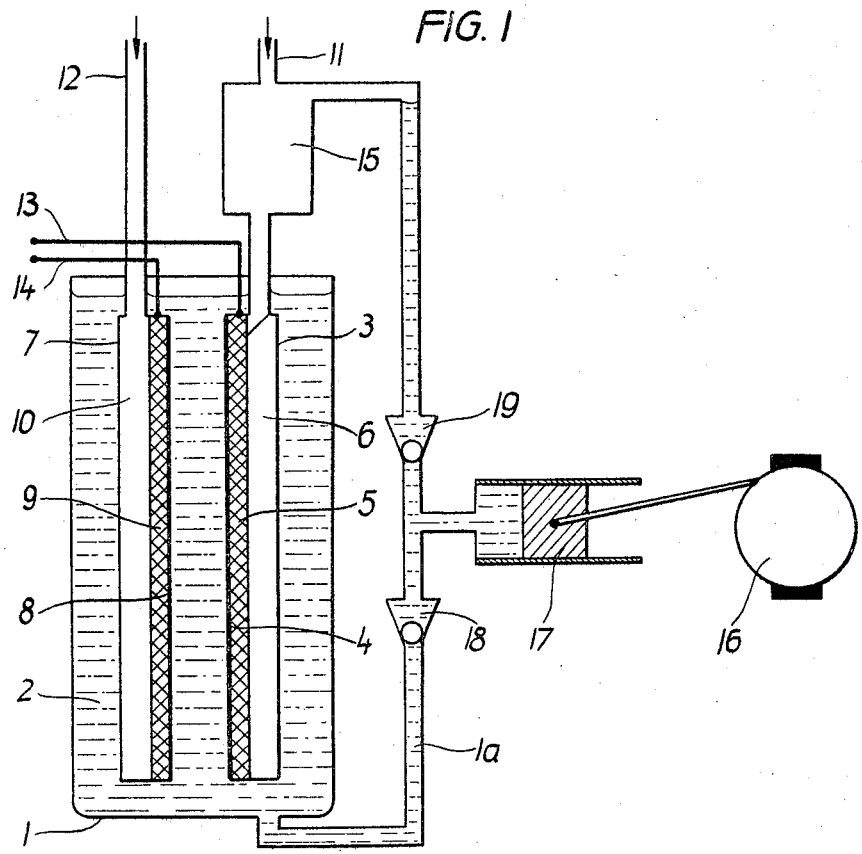

Inventors:
Eduard Justi and August Winsel

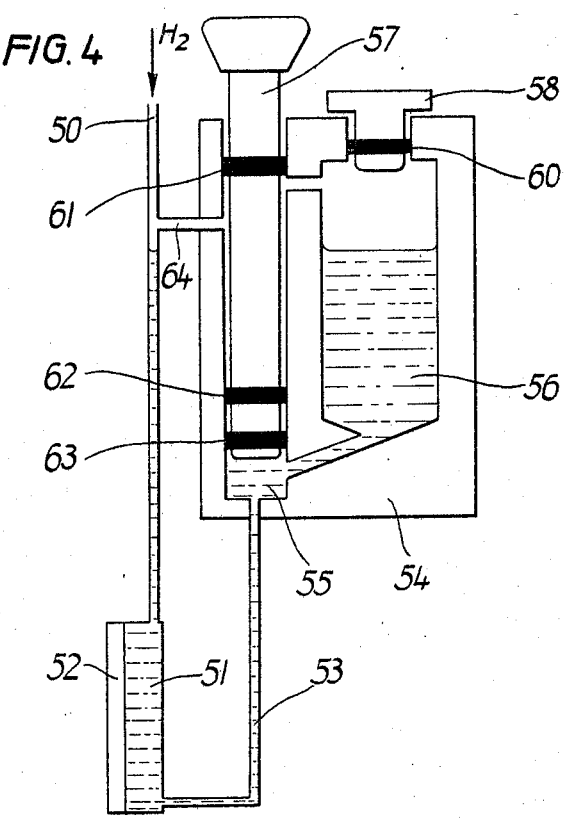
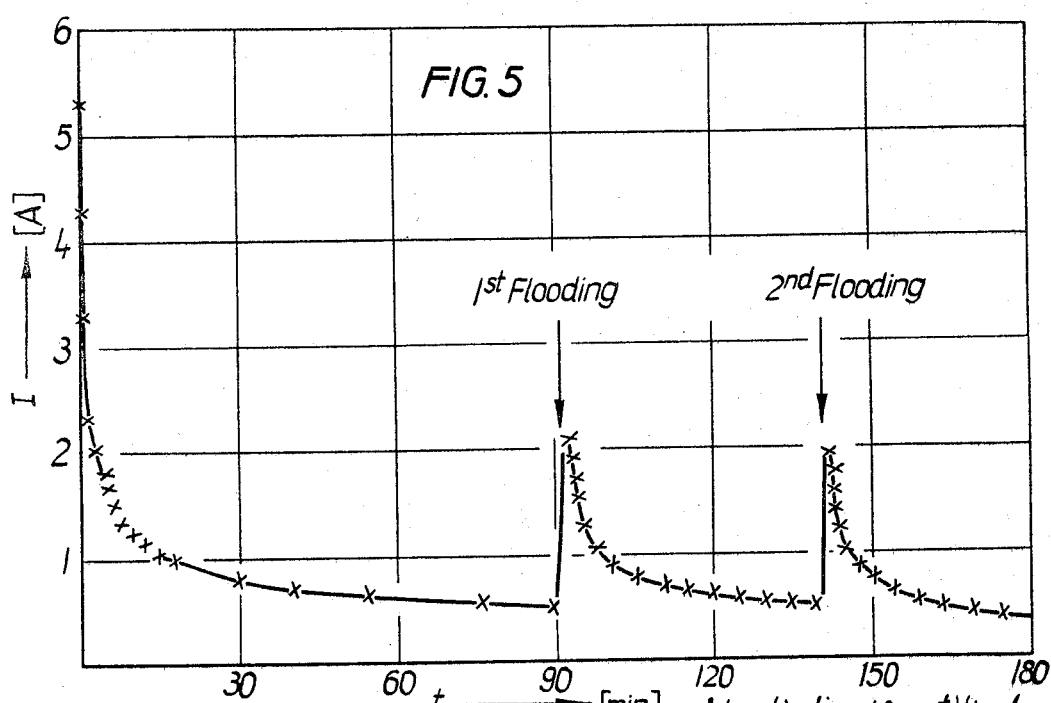

3,428,491
METHOD AND APPARATUS FOR REDUCING THE CONCENTRATION POLARIZATION OF A FUEL CELL
Eduard Justi and August Winsel, Braunschweig, Germany, assignors to Siemens Aktiengesellschaft, Erlangen, and Varta Aktiengesellschaft, Hagen, Westphalia, Germany, both corporations of Germany
Filed Apr. 2, 1963, Ser. No. 269,907
Claims priority, application Germany, Apr. 6, 1962, A 39,893
U.S. Cl. 136—86    14 Claims
Int. Cl. H01m 29/00

The present invention relates to the operation of fuel cells, and more particularly to a system for reducing the concentration polarization in gas diffusion electrodes as they are used in such cells.

Concenrtation polarization is the loss of potential during current flow due to mass transport limitations in the cell. During current flow, the reactant has to be transported to the reaction site and energy is thus used in overcoming the resistance to flow which is always present (see also pages 46 to 48 of "Fuel Cells" by G. J. Young, Reinhold Publishing Corporation, New York (1960).

While the improvements disclosed herein are applicable to all porous gas diffusion electrodes not only in fuel cells but also in dialysis cells and other electrochemical devices wherein concentration polarization is encountered, they will be particularly described herein with reference to fuel cells provided with double layer electrodes wherein hydrogen is used as the fuel at one diffusion electrode and oxygen is used as the oxidant at the other diffusion electrode, the two electrodes being immersed in an electrolyte chamber containing an aqueous electrolyte which is normally a strong potassium hydroxide solution. The diffusion electrodes are porous structures of a catalytic metal, such as nickel, platinum, palladium, etc. At the anode, hydrogen molecules ($H_2$) are delivered to one surface of the porous electrode and are catalytically decomposed therein into hydrogen atoms (H), positive hydrogen ions ($H^+$) being delivered by the electrode into the electrolyte solution, with the adsorption of electrons in the electrode. A similar process takes place at the cathode where oxygen molecules ($O_2$) are converted into oxygen atoms which, in the electrolyte, react with the hydrogen atoms to form hydroxyl groups ($OH^-$), electrons being removed from the electrode.

The diffusion electrodes are highly porous structures which separate the electrolyte chamber from chambers adjacent the opposite surface of the electrodes, which chambers receive the respective operating gas of the fuel cell. Capillary pressure $p_k$ forces the electrolyte into the electrode pores, $p_k = 2\sigma/r$, wherein $r$ is the radius of the electrode pores and $\sigma$ is the surface tension of the electrolyte. When the gas pressure is so chosen that it substantially equals the sum of the hydrostatic pressure P in the electrolyte and the capillary pressure $p_k$ in the electrode pores, it will partially displace the electrolyte from the electrode pores and form the triple interface electrode/electrolyte/gas necessary for the electrochemical conversion of the gas. When the electrode consists of a single layer of substantially equal pore sizes, a portion of the gas will escape into the electrolyte through some of the pores which are bigger than the majority of pores.

To avoid this loss, it has been proposed to use porous electrodes with two porous layers, i.e., a fine pore layer with pores of a radius $r_1$ on the electrolyte side and a coarse pore layer with pores of a radius $r_2$ on the gas side. A small pressure differential is set up in the cell across each electrode so that the electrolyte is expelled from the large pores on the gas side but the gas cannot bubble through the smaller pores on the electrolyte side, owing to the surface tension of the electrolyte. The gas pressure $p_G$ is so selected that it is greater than the sum of the pressure in the electrolyte chamber and the capillary pressure in the coarse pore layer on the gas side but smaller than the corresponding sum of the pressure in the fine pore layer on the electrolyte side, i.e., $$2\sigma/r_1 + P > p_G > 2\sigma/r_2 + P$$

In this case, the triple interface will be formed at the interface between the fine pore layer and the coarse pore layer of the electrode.

During discharge, the electrical current must be transported by the ions within the electrolyte filament filling the pores. Because the ions have different mobility and the chargeless particles diffuse slowly, the concentration tends to decrease during operation of the cell from the mouth of the pores toward the triple boundary where the electrochemical reaction takes place. This causes an additional concentration polarization and a corresponding limiting current $i_e$ which greatly reduces the efficiency of the fuel cell.

It is the primary object of the present invention to reduce or substantially eliminate this phenomenon and thereby to increase the efficiency of fuel cells.

This is accomplished according to this invention by transporting fresh electrolyte of the initial electrolyte concentration $c_0$ to the triple boundary electrode/electrolyte/gas. For the transport of fresh electrolyte into the electrode pores use is made of the pressure differential between the gas and electrolyte sides of the electrode, this pressure differential carrying the fresh electrolyte into the pores. This may be accomplished in a variety of ways, including:

(1) The operating gas pressure $p_G$ may be periodically reduced, for instance by reducing the pressure in the gas chamber or by permitting the electrode to consume the gas while interrupting the gas supply, whereby the hydrostatic pressure P of the electrolyte will force some electrolyte through the electrode into the gas chamber adjacent the opposite surface of the electrode. When the full operating gas pressure is restored, the gas pressure will drive back electrolyte of the original concentration $c_0$ into the electrode pores to the triple boundary.

(2) Fresh electrolyte of concentration $c_0$ is supplied to the gas chamber so that it wets the electrode on the gas side. Due to the normal pressure differential between the two opposite surfaces of the electrode, this fresh electrolyte is automatically pressed into the pores and to the triple boundary, flushing the porous electrode with fresh electrolyte and forcing the used-up electrolyte back into the electrolyte chamber. This brings the concentration of the electrolyte at the triple boundary to its initial value $c_0$, i.e., the same as that of the electrolyte in the electrolyte chamber.

While system (1) requires possibly complicated pressure changes in the system and may, therefore, be difficult to operate, system (2) requires no pressure changes and is, therefore, the simplest. For this reason, the invention will be particularly described and illustrated in connection with this preferred embodiment.

In this preferred system it suffices to introduce the fresh electrolyte at a suitable location into the gas conduit and it will then be transported in the gas flow into the electrode pores. Advantageously, the fresh electrolyte is metered into the gas chamber at predetermined intervals or, better yet, when a cell potential has been reached which indicates a serious reduction of the concentration polarization. Any desired minimum potential may be set and the fresh electrolyte transportation may be controlled in response to the set minimum potential.

In hydrogen-oxygen cells, wherein the electrolyte concentration is maintained through electrodialysis by separating the reaction water, the resultant concentrated electrolyte may be used as fresh electrolyte.

The fresh electrolyte needs to be transported to the triple reaction boundary only for a matter of a few minutes, at most, to restore the desired cell potential. Whether the cell discharge is maintained during these few minutes or discontinued, is a question of electrode capacity. If this capacity is low and discharge is desirably discontinued, this may also be automatically controlled in response to the actuation of the fresh electrolyte transport.

In a preferred embodiment of the invention, a fuel cell plant is operated with a plurality of individual cells and fresh electrolyte is periodically transported into the pores of the cell electrodes of successive cells. One part of the cells are periodically rejuvenated while the other part delivers current. While each cell operates only intermittently in such a plant, it delivers considerably higher discharge currents.

If the operating time $t$ between two periodic rejuvenation cycles, during which a maximum load may be connected to the cell, is divided by the time period $\Delta t$ of rejuvenation, during which no discharge takes place, this ratio is equal to the minimum ratio of the total number $n$ of cells and the number $\Delta n$ of cells being rejuvenated at a time, i.e., $$t/\Delta t = n/\Delta n$$

Figure 3:
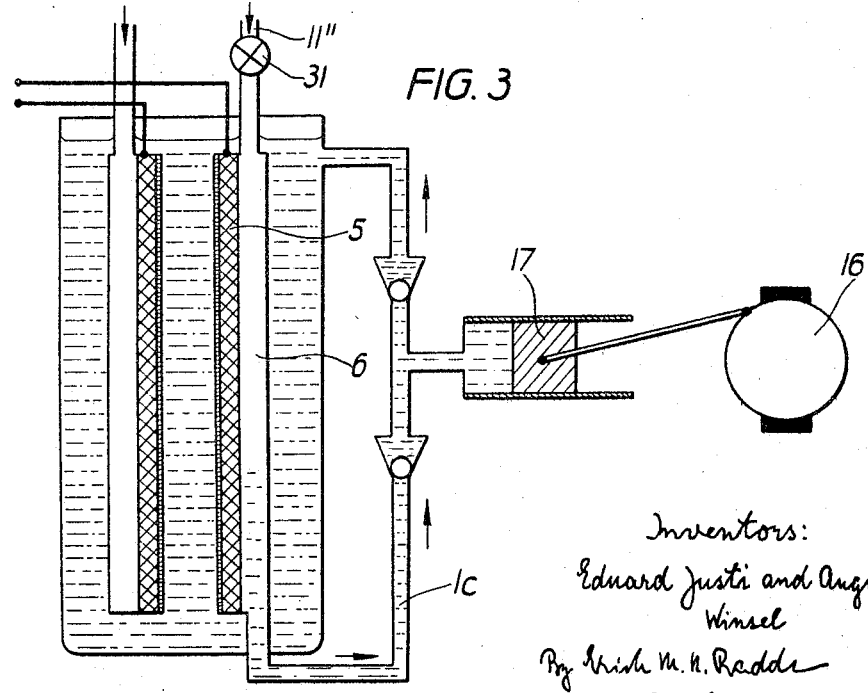
Figure 2:
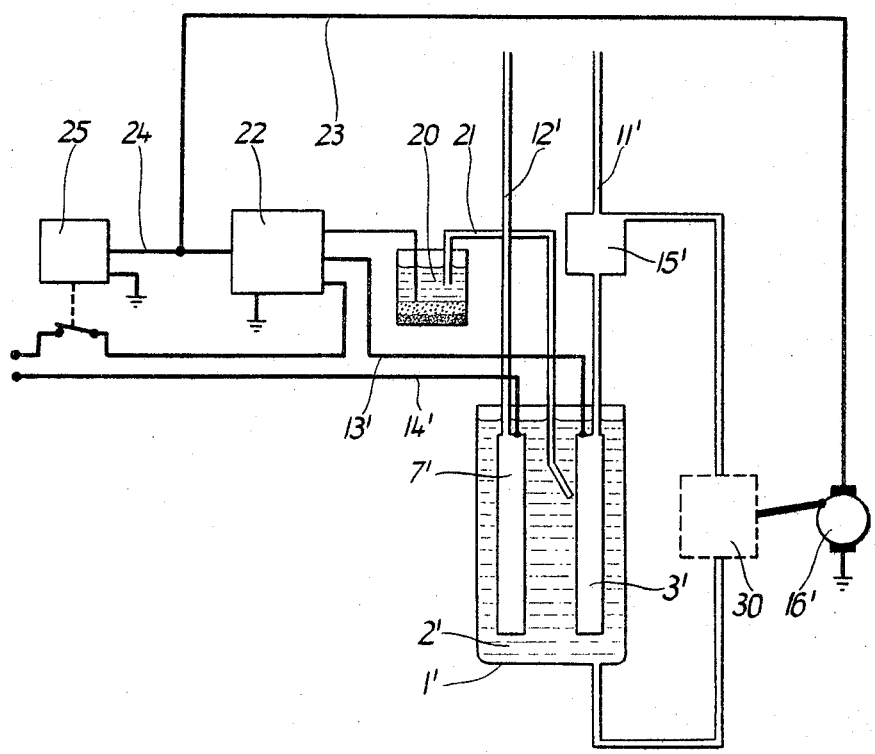

The above and other objects, advantages and features of the present invention will be more fully explained in the following detailed description of preferred embodiments thereof, taken in conjunction with the accompanying drawing wherein FIG. 1 schematically shows a fuel cell arrangement according to one embodiment of this invention;

FIG. 2 schematically illustrates another arrangement including automatic control means;

FIG. 3 shows a variant of the embodiment of FIG. 1;

FIG. 4 schematically illustrates an exemplified arrangement; and

FIG. 5 is a graph showing the effectiveness of the invention.

Referring first to FIG. 1, there is shown a fuel cell container 1 defining an electrolyte chamber containing electrolyte 2.

Useful electrolytes include, for instance, 5 N to 10 N potassium hydroxide solutions, concentrated sodium hydroxide solutions, concentrated hydrochloric acid or sulfuric acid solutions, and other bases and acids of such strength. In certain fuel cells operating with organic fuels, sodium or potassium carbonate-bicarbonate solutions in equilibrium—as described in U.S. Patent No. 3,082,282—may be used at higher temperature operating conditions. With such electrolytes, the invention is of particular advantage because the low diffusion coefficient of these solutions and also of fused salts tends to raise the concentration polarization rapidly.

Any gas diffusion electrode may be used, such as described by Young in "Fuel Cells," by Bacon in his British Patent No. 667,298, by Justi et al. in their U.S. Patent No. 2,928,891 and others. Two porous diffusion electrodes 3 and 7 are immersed in the electrolyte chamber, each of the electrodes comprising a fine pore layer on the electrolyte side and a coarse pore layer on the gas side. The back walls of the electrodes define a gas chamber with the coarse pore layer. Electrode 3 is the anode consisting of fine pore layer 4 the surface of which is in contact with the electrolyte and coarse pore layer 5 having an opposite surface adjacent gas chamber 6, hydrogen being delivered into the gas chamber 6 under pressure through conduit 11. Electrode 7 is the cathode consisting of fine pore layer 8 the surface of which is in contact with the electrolyte and coarse pore layer 9 having an opposite surface adjacent gas chamber 10 receiving oxygen through conduit 12, also under pressure. The electrodes are connected to current conductors 13 and 14 to be connected to a load (not shown).

The hydrogen conduit 11 includes a storage container 15 arranged in advance of the gas chamber 6.

When the continued current flow through conductors 13, 14 causes the electrolyte in the fine pore layer 4 of the anode 3 to be diluted, thus causing a loss of potential, fresh electrolyte is transported into this layer through branch conduit 1a leading from the electrolyte chamber to the hydrogen delivery conduit. In this branch conduit, the means for transporting the fresh electrolyte includes a suction valve 18 and an outlet 19 operated by reciprocation of piston 17. A suitable source for reciprocating the piston, such as motor 16, is connected to the piston. When the piston is moved outwardly in its cylinder, one of the chambers of which is in communication with branch conduit 1a between valves 18 and 19, the resultant suction will open suction valve 18 and thus pump electrolyte chamber into the branch conduit. When it is pressed inwardly, the resultant pressure will close the suction valve and force outlet valve 19 open, thus transporting the electrolyte pumped out of the electrolyte chamber into the storage container 15, whence it flows into gas chamber 6 and is carried by the gas flow through the coarse pore layer 5 into the fine pore layer 4. Thus, the pores of the electrode layers are filled with concentrated, fresh electrolyte and the concentration polarization is eliminated.

If the operating gas for the anode is hydrogen including inert gas impurities, an outlet conduit means (not shown), including a valve, must be provided to remove the inert gases from gas chamber 6. In this case, it will be advantageous to close the inert gas outlet valve while fresh electrolyte is transported to the anode.

The pump capacity is sufficient to transport enough electrolyte for covering the electrode surface adjacent the gas chamber 6 completely with fresh electrolyte. The distribution of the fresh electrolyte over the entire electrode surface may be effected by any suitable means obvious to the skilled in the art. For instance, a pipe may be arranged at the upper horizontal edge of the electrode and parallel thereto to receive the electrolyte from storage container 15, the pipe having holes or slots to permit the fresh electrolyte to cascade down the electrode surface from the pipe. Also, a suitable system of channels may be provided in the pore layer to distribute the fresh electrolyte evenly throughout this porous layer.

FIG. 2 illustrates an automatically controlled plant for the operation of a fuel cell similar to the one in FIG. 1 and including a fuel cell container 1' holding electrolyte 2'. The diffusion electrodes 3' and 7' are immersed in the electrolyte and operating gases are supplied thereto under pressure through conduits 11' and 12', current conductors 13', 14' being connected to a load (not shown). The fresh electrolyte transporting means in branch conduit 1b is schematically shown in this FIG. 2 by box 30, being the same as that in FIG. 1 and being operated by motor 16', to transport fresh electrolyte from the fuel cell container 1' to the storage container 15' in the hydrogen delivery conduit.

A comparison test electrode 20 is connected to the anode 3' and electrolyte from the fuel cell is conducted to the electrode 20 by electrolyte bridge conduit 21. A control amplifier 22 has its input connected to the current discharge conductors 13', 14' of the fuel cell and to the test electrode 20 while its output is connected by conductor 23 to motor 16' and by conductor 24 to time relay 25, this assembly constituting a control means periodically actuating the fresh electrolyte transporting means.

When continued discharge causes a concentration polarization in fuel cell electrode 3', this will be noted by a change in the voltage between electrode 3' and comparison electrode 20. This voltage lies between conductors 13' and 20 and is fed into the amplifier input. In this amplifier, this voltage is compared to that current discharged by current conductors 13', 14'. This may be done, for instance, by comparing it with the voltage decrease in a resistance element in control amplifier 22. In this manner, the polarization present in anode 3 without the concentration polarization is eliminated.

As soon as the concentration polarization in electrode 3 exceeds a set value, amplifier 22 will deliver current to motor 16' to actuate the electrolyte transporting means 30 in the manner described in connection wth FIG. 1. This will rejuvenate the electrode in the hereinabove described manner. Simultaneously, the amplifier will deliver current to time relay 25 which operates a switch in current conductor 14' and thus interrupts the current delivery from the fuel cell for a set period of time. Upon termination of the fresh electrolyte flow, the time relay again closes the switch and current is delivered from the cell to its terminals.

Instead of a separate test electrode 20, the cathode 7' may be used as comparison electrode, if desired.

Since, in practice, the time period required for building up a given concentration polarization in a given fuel cell at a given discharge is known, the test electrode may be eliminated entirely and the fresh electrolyte transporting means may be actuated periodically as set time intervals.

The formation of the concentration polarization proceeding at the same rate as the load current, i.e., increasing more rapidly as the discharge current increases, the frequency of the rejuvenation intervals is preferably chosen inversely proportional to the discharge current according to the relation $$\tau \geq \tau_0 = 1/(i - i_e)$$

wherein $\tau$ is the length of the interval between rejuvenation, $i$ is the discharge current, $i_e$ is the limiting current for a stationary discharge current if no rejuvenation takes place, and $\tau - \tau_0$ is a desired safety factor for the operation of the cell according to the invention.

FIG. 3 is the same in every respect as FIG. 1, except for the conduits leading from the cell to the pump 16, 17, for which reason the other portions of the cell have neither been designated by reference numerals nor are they again described. In this variant, the hydrogen conduit 11' delivers the fuel gas under pressure to the electrode gas chamber 6 and when it is desired to transport fresh electrolyte into the electrode 5, the valve 31 in conduit 11' is closed. Since the continued discharge of the fuel cell causes the electrochemical reactions in the cell to use up gas, the gas pressure in chamber 6 is diminished and fresh electrolyte will enter from the electrolyte chamber into the electrode pores and thence into the gas chamber. The electrolyte recirculation conduit 1c, including pump 16, 17, will move the electrolyte from the gas chamber back into the electrolyte chamber of the cell, as shown. Alternatively, no such recirculation system need be provided and, when the valve 31 is opened again, the gas pressure will press the electrolyte back into the electrode pores and thence into the electrolyte chamber.

The following example is given by way of illustration and without in any way limiting the invention:

The hydrogen electrode was a double skeleton catalyst electrode with a gas distribution layer having a covering layer of 3 g. of carbonyl nickel powder of an average grain size of about $3/\mu$, an operating layer of 10 g. of a mixture of 1.6 parts, by weight, of carbonyl nickel powder and 1 part, by weight, of a Raney nickel alloy of nickel and aluminum in equal proportions, and a grain size of about 35 to $50/\mu$, and a layer facing the gas chamber of 22 g. of a mixture of potassium chloride and carbonyl nickel powder in a weight proportion of 1:2. The electrode was pressed and sintered at a temperature of 400° C. at a pressure of 1.82 t./sq. cm., after which the aluminum and potassium chloride were leached out with hot 5 N potassium hydroxide solution. The diameter of the finished electrode was 46 mm.

As shown in FIG. 4 the finished electrode 52 was placed into a steel mounting defining gas chamber 51 with the electrode. The nickel pipe 50 delivers hydrogen to the electrode under pressure and a conduit 53 having an inner diameter of 2 mm. connects the gas chamber with a tubular chamber 55 having a branch leading to electrolyte storage chamber 56. In the illustrated position of the piston 57 in the tubular chamber 55, this chamber is in communication with a branch line 64 leading from the gas delivery conduit 50 into the tubular chamber 55. Thus, the gas is recirculated in a closed system and the hydrostatic pressure causes an equal level of electrolyte in storage chamber 56 and conduit 50, the gas chamber being full of electrolyte and the entire surface of the electrode facing the gas chamber being evenly wetted with electrolyte.

When the piston, with its gaskets 61, 62, and 63, is pressed downwardly into the tubular chamber 55, the communication is interrupted. The pressure of the gas in conduit 50 will force the electrolyte out of the gas chamber 51 and through the pores of the electrode.

The storage chamber 56 is covered by closure 58 provided with gasket 60, which may be removed whenever it is desired to fill the chamber with fresh electrolyte.

The gas chamber volume is 6 cc. and the time of fresh electrolyte transport through the electrode pores is 6½ minutes. The electrolyte is 6 N KOH.

The flooding of the gas chamber takes about 15 seconds until the electrolyte levels in 50 and 56 are even from the moment at which the piston has reached the illustrated position. At a gas pressure of about 2 atm., the speed of electrolyte movement through the electrode is 2.3 cc./min., i.e., a speed of 0.9 cc./sq. cm. of electrode area.

The efficiency of the electrolyte transportation through the electrode pores may be judged from the graph of FIG. 5. With the aid of a potentiostat, a polarization of 0.6 v. was imparted to the electrode and the potentiostatically flowing current was measured. The current delivery is shown in dependence on the time. After 90 and 140 minutes, the electrode was flooded with fresh electrolyte in accordance with this invention and, as can be seen from the graph, each time the current increased markedly.

When using as electrolyte alkaline metal hydroxide solutions and fused salts of alkaline reaction resp. acidic solutions and melts, it is of particular advantage to flood the porous fuel electrode resp. the porous oxydation electrode.

The transport of fresh electrolyte into the electrode pores according to the invention is important in all cases where a concentration polarization must be encountered. This always occurs as soon as, in electrochemical processes, any liquid electrolyte (aqueous, nonaqueous, molten) within a pore system contacts a gaseous substance, as for instance shown in the FIGURES 1–4 of the present application or in FIGS. 4–5 of the before mentioned book, "Fuel Cells," which figure shows a porous one layer electrode.

We claim:

1. The method of reducing concentration polarization during the operation of a fuel cell comprising a gas diffusion electrode separating an electrolyte chamber from a gas chamber and having a finer pore electrolyte side layer and a coarser pore gas side layer, the gas pressure being greater than the sum of the capillary pressure of the electrolyte in the coarse pores and the electrolyte pressure in the electrolyte chamber and smaller than the sum of the electrolyte pressure and the capillary pressure in the fine pores, the pores of the layers being at least partly filled with electrolyte and gas, respectively during operation, the method which comprises, while feeding gaseous fuel or gaseous oxidant to the gas chamber of the gas diffusion electrode, feeding electrolyte to the gas chamber side surface of the coarse pore layer of the electrode, thereby supplying it to the three-phase boundaries formed by the electrode, electrolyte and gas in the interior of the pores, and in such a manner as to reduce concentration polarization, and discontinuing said feeding of electrolyte when the concentration polarization has been reduced to a predetermined level while continuing the operation of the fuel cell by continuing the feeding of gaseous fuel or gaseous oxidant to said gas chamber.

2. The process of claim 1 in which the step of feeding electrolyte is carried out intermittently for limited periods of time until the concentration polarization has been rereduced to the predetermined level and then discontinuing said feeding.

3. In the operation of a fuel cell according to claim 1, the step of metering a supply of the fresh electrolyte into the gas chamber at predetermined intervals of time.

4. The process of claim 1 in which the electrolyte is caused to cascade down the said electrode surface.

5. The process of claim 1 which is carried out concurrently with cell discharge.

6. The process of claim 1 which is carried out while cell discharge is discontinued.

7. The process of claim 1 which is initiated when concentration polarization exceeds a predetermined limit.

8. The process of claim 1 which comprises performing the steps of feeding the electrolyte and discontinuing its feeding, sequentially a plurality of times during the operation of the fuel cell, thereby feeding the electrolyte when the polarization exceeds a predetermined concentration and discontinuing its feeding when the concentration polarization has been reduced to the predetermined level.

9. The process of claim 1 which is operated with a plurality of individual cells each cell having two electrodes in which at least one but less than all of the plurality of individual electrodes is periodically supplied with electrolyte at the gas chamber side surface of the coarse pore layer of the electrode and the supplying of electrolyte being then discontinued while the remaining individual cells are delivering electric current, in such a manner that the individual cells are alternatingly operated and alternatingly rejuvenated by decreasing the concentration polarization to the predetermined level.

10. The process of claim 1 in which the electrolyte which is fed to the gas chamber side of the electrode is carried by the gaseous flow of fuel or oxidant.

11. A fuel cell plant comprising a fuel cell comprising an electrolyte chamber, a gas chamber, a porous gas diffusion electrode having two layers, each one of a different pore size, said electrode being positioned to separate the electrolyte chamber from the gas chamber and to have the layer with the fine pores in contact with the electrolyte and the layer with the coarse pores facing the gas chamber, a conduit delivering an operating gas selected from the group of a gaseous fuel and a gaseous oxidant into the gas chamber adjacent the electrode layer having the coarse pores, means for maintaining the gas under a pressure greater than the sum of the capillary pressure of the electrolyte in the coarse pores and the electrolyte pressure in the electrolyte chamber and smaller than the sum of the electrolyte pressure and the capillary pressure in the fine pores, and additional means on the gas chamber side for intermittently supplying electrolyte with the gas flow for limited periods of time and for discontinuing the supplying thereof to the gas chamber side surface of the coarse pore layer of the electrode.

12. The fuel cell plant of claim 11 comprising a multiplicity of individual fuel cells each one having two electrodes and the means for alternatingly operating and rejuvenating the individual cells.

13. The method of reducing concentration polarization during the operation of a fuel cell comprising a gas diffusion electrode separating an electrolyte chamber from a gas chamber and having a finer pore electrolyte side layer and a coarser pore gas side layer, the gas pressure being greater than the sum of the capillary pressure of the electrolyte in the coarse pores and the electrolyte pressure in the electrolyte chamber and smaller than the sum of the electrolyte pressure and the capillary pressure in the fine pores, the pores of the layers being at least partly filled with electrolyte and gas, respectively, during operation of the fuel cell, the method which comprises feeding gaseous fuel or gaseous oxidant under pressure to the gas chamber of the gas diffusion electrode, reducing the feeding of said gaseous fuel or oxidant when polarization exceeds a predetermined level, thereby permitting the electrode to consume said gas, thus reducing pressure in the gas chamber and whereby the electrolyte under pressure is caused to flow from the electrolyte chamber through the pores of the electrode to the three-phase boundaries formed by the electrode, electrolyte, and gas in the interior of the pores and into the gas chamber adjacent the opposite surface of the electrode in such a manner as to reduce concentration polarization, then restoring the feeding of said gaseous fuel or gaseous oxidant under pressure when the concentration polarization has been reduced to a predetermined level, and continuing the operation of the fuel cell by continuing the feeding of said gaseous fuel or gaseous oxidant to said gas chamber.

14. The process of claim 13 in which the feeding of said gaseous fuel or oxidant is interrupted, thereby permitting the electrode to consume said gas and supplying the electrolyte to the three-phase boundaries formed by the electrode, electrolyte, and gas in the interior of the pores and into the gas chamber adjacent the opposite surface of the electrode in such a manner as to reduce concentration polarization.

References Cited

UNITED STATES PATENTS

| | | | |
|---|---|---|---|
| 2,947,797 | 8/1960 | Justi et al. | 136—86 |
| 2,925,455 | 2/1960 | Eidensohn | 136—86 |
| 668,838 | 2/1901 | Lavison | 136—86 |
| 3,242,010 | 3/1966 | Bodine | 136—86 |
| 2,925,454 | 2/1960 | Justi et al. | 136—86 |
| 3,227,585 | 1/1966 | Langford et al. | 136—86 |
| 2,273,795 | 2/1942 | Heise et al. | 204—98 |

WINSTON A. DOUGLAS, *Primary Examiner.*

H. FEELEY, *Assistant Examiner.*